United States Patent
Hwang et al.

(10) Patent No.: US 7,512,257 B2
(45) Date of Patent: Mar. 31, 2009

(54) CODING SYSTEM AND METHOD OF A FINGERPRINT IMAGE

(75) Inventors: Woon Joo Hwang, Seoul (KR); Taek Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 703 days.

(21) Appl. No.: 11/076,119

(22) Filed: Mar. 9, 2005

(65) Prior Publication Data
US 2005/0201596 A1 Sep. 15, 2005

(30) Foreign Application Priority Data
Mar. 10, 2004 (KR) .................. 10-2004-0016113

(51) Int. Cl.
*G06K 9/00* (2006.01)
(52) U.S. Cl. ....................................... 382/125
(58) Field of Classification Search .................. 382/125
See application file for complete search history.

(56) References Cited

U.S. PATENT DOCUMENTS 6,876,757 B2 * 4/2005 Yau et al. ..................... 382/125
2002/0146178 A1 * 10/2002 Bolle et al. .................. 382/254
2003/0095714 A1 * 5/2003 Avinash ....................... 382/260

OTHER PUBLICATIONS

"Matched Filter Design for Fingerprint Image Enhancement", O'Gorman et al., Acoustics, Speech, and Signal Processing, 1988. ICASSP-88., 1988 International conf. Apr. 11-14, 1988 pp. 916-919 vol. 2.*
Sherlock B G et al.,: "Fingerprint enhancement by directional Fourier filtering"; IEE Proc: Vision, image and signal processing, Institution of Elect. Engrs, , vol. 141 No. 2, Apr. 1, 1994.
Greenberg S. et al.; "Fingerprint Image Enhancement using Filtering Tech."; Real-Time Imaging, Academic Press Ltd., GB, vol. 8, No. 3, Jun. 2002, pp. 227-236, XP004419725.
Huvanandana, S. et al.: "A hybrid system for auto. fingerprint identif." Proceedings of the 2003 Int'l Sympm. on Cir. & Systems, vol. II, Mar. 25, 2003, pp. 952-955, XP002332339.
O'Gorman L. et al.: "An Approach to Fingerprint Filtr Design"; Pattern Recognition, Elsevier, Kidlington, GB, vol. 22, No. 1, Jan. 1989, pp. 29-38, XP000112058, ISSN: 0031-3203.

* cited by examiner

*Primary Examiner*—Wenpeng Chen
(74) *Attorney, Agent, or Firm*—Lee, Hong, Degerman, Kang & Waimey

(57) ABSTRACT

A binary coding method of a fingerprint image, the method comprises detecting a ridge range direction and a ridge curvature of the fingerprint image; and binary coding the fingerprint image using a binary coding filter selected in accordance with the ridge curvature.

18 Claims, 3 Drawing Sheets

CODING SYSTEM AND METHOD OF A FINGERPRINT IMAGE

CROSS-REFERENCE TO RELATED APPLICATIONS

Pursuant to 35 U.S.C. § 119(a), this application claims the benefit of earlier filing date and right of priority to Korean Application No. 10-2004-0016113, filed on Mar. 10, 2004, the contents of which are hereby incorporated by reference herein in its entirety.

BACKGROUND OF THE INVENTION

1. Field of the Invention

The present invention relates to a fingerprint recognition method, and more particularly, to a coding method of a fingerprint image that accurately converts a fingerprint image into a binary code to detect a featured vector required for recognizing the fingerprint. The coding method accurately removes image flaws and recovers fingerprint ridges with reference to the original image of the fingerprint.

2. Description of the Related Art

In recent years, a variety of personal certifying methods use a user's iris, fingerprint, face profile, and the like to determine identity. Biometrics use of fingerprint recognition has increased due to the simple nature of obtaining fingerprints and because the recognition time of a fingerprint image is short.

Conventional fingerprint image methods detect and convert a fingerprint image into a binary code to produce, for example, a monochrome image.

Conventional binary coding methods, using a single threshold, detect from the whole image using an upper and lower limit of the single threshold defined for binary-coding the image. To define the background area and solve brightness uniformity problems incurred during image detection, a conventional binary coding method has been proposed that detects local thresholds and converts locally the image into a binary code, for example, a black and white image.

As described above, conventional binary coding methods may use a variable threshold to produce a printable and storable binary image that accurately represents the fingerprint image. However, these conventional methods have disadvantages when a feature vector is detected and a fingerprint comparison is performed. For example, when a ridge of a fingerprint is recognized in a variety of user's features according to its circumference, the accuracy of fingerprint recognition is deteriorated.

Conventional binary coding methods may not effectively repair damage to a fingerprint image. For example, junctions or breaks in a ridge of a fingerprint image or other image flaws may cause fingerprint image recognition errors and result in failed fingerprint image recognition.

An inaccurately coded binary image complicates problems associated with image post-processing.

SUMMARY OF THE INVENTION

A binary coding method of a fingerprint image is provided. The method comprises detecting a ridge range direction and a ridge curvature of the fingerprint image, and binary image coding the fingerprint image using a binary coding filter that is selected in accordance with the ridge curvature. The binary coding filter may be selected by comparing the ridge curvature with a predetermined reference value.

The ridge curvature is preferably calculated in response to the ridge range direction with respect to a sub-image of the fingerprint image.

The ridge curvature may be calculated on the basis of the ridge range direction with respect to a first sub-image with reference to a second sub-image, wherein the first sub-image occupies a smaller surface area than that of the second sub-image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and incorporated herein constitute a part of the application, illustrate embodiment(s) of the invention and together with the description serve to explain the principle of the invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
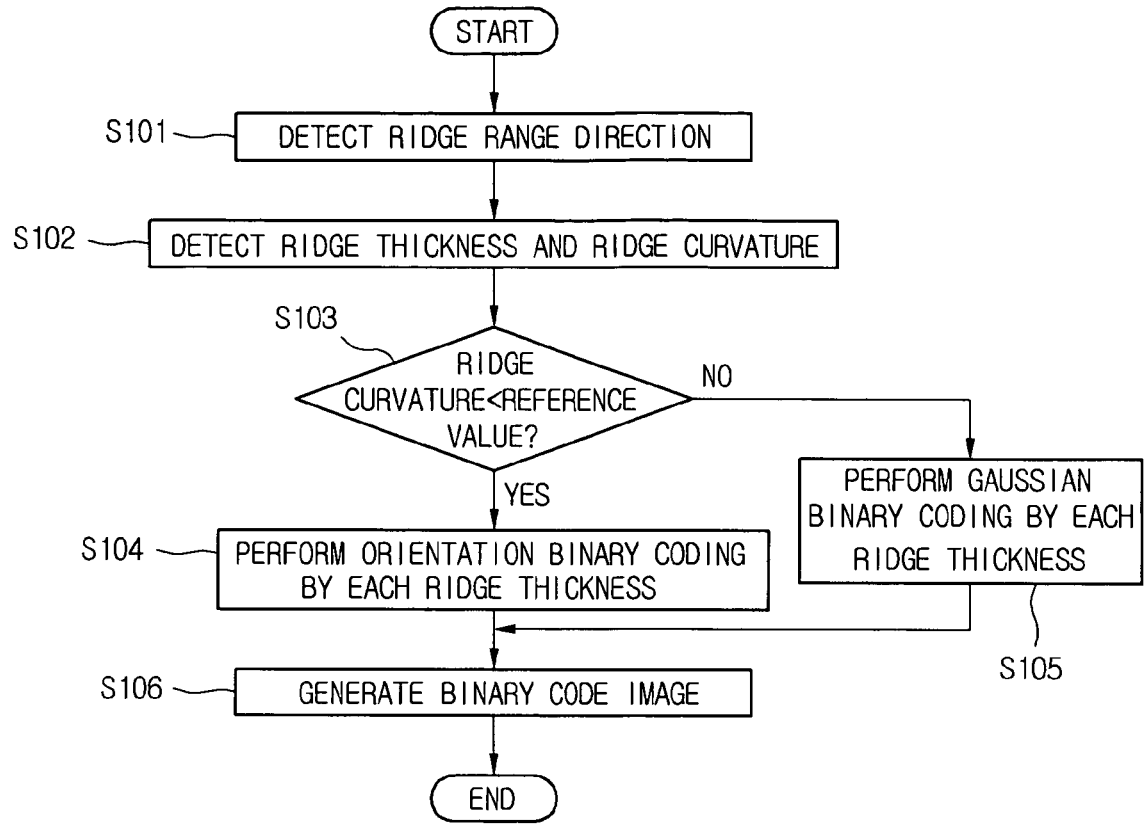
FIG. 1 is a flowchart illustrating a binary coding method of a fingerprint image according to an embodiment of the present invention.

FIG. 1 is a flowchart illustrating a binary coding method of a fingerprint image according to an embodiment of the present invention.

A direction of a ridge range is detected from a fingerprint image (S101). A ridge curvature and thickness are extracted from a ridge of the ridge range (S102).

Detection of the ridge range direction (S101) is a pre-process operation for binary-coding of the fingerprint image. The ridge range direction detection is performed, for example, with respect to a sub-image of the fingerprint image.

When a direction of a ridge range is detected, in this example, based on the sub-image, the ridge range direction is very sensitive to the image flaws, whereby junctions and breaks in a ridge of the fingerprint cause difficulty in accurately detecting a direction of the ridge range. In this example, the ridge range direction is detected from a first sub-image, for example occupying an 8×8 pixel window, with reference to a second sub-image, for example occupying a 16×16 pixel window. To avoid difficulty determining the direction of the ridge range of a sub-image of an image area that is large, a proper distribution of sub-image pixels is required to accurately detect fingerprint images.

Figure 2:
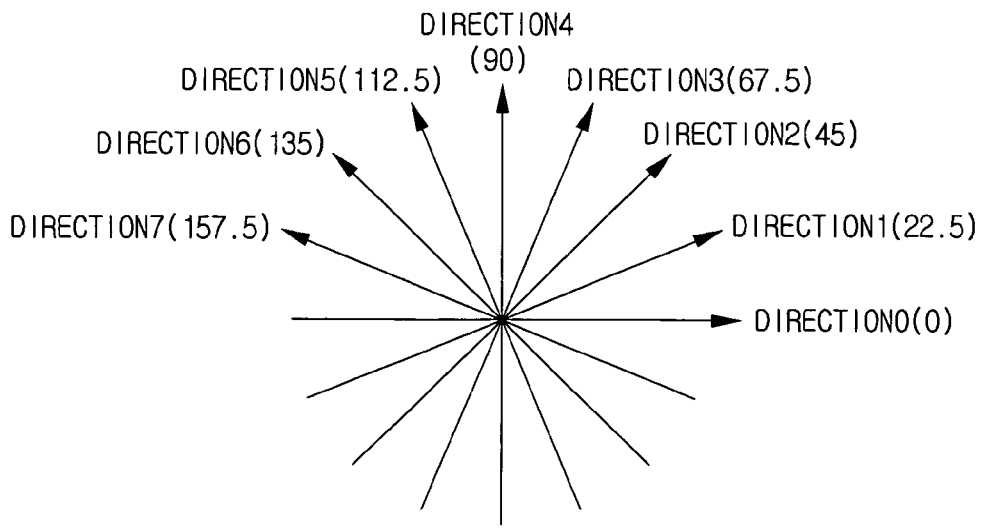
FIG. 2 is a schematic illustrating a method for defining a ridge direction within the fingerprint image for the binary coding method according to an embodiment of the present invention.

Referring to FIG. 2, the ridge range direction, for example, is defined by dividing a 180° sector into eight 22.5° sub-sectors. Detection of the ridge range direction is illustrated, in one preferred embodiment of the present invention, using an 8×8 pixel window sub-image as shown in FIG. 3.

Figure 3:
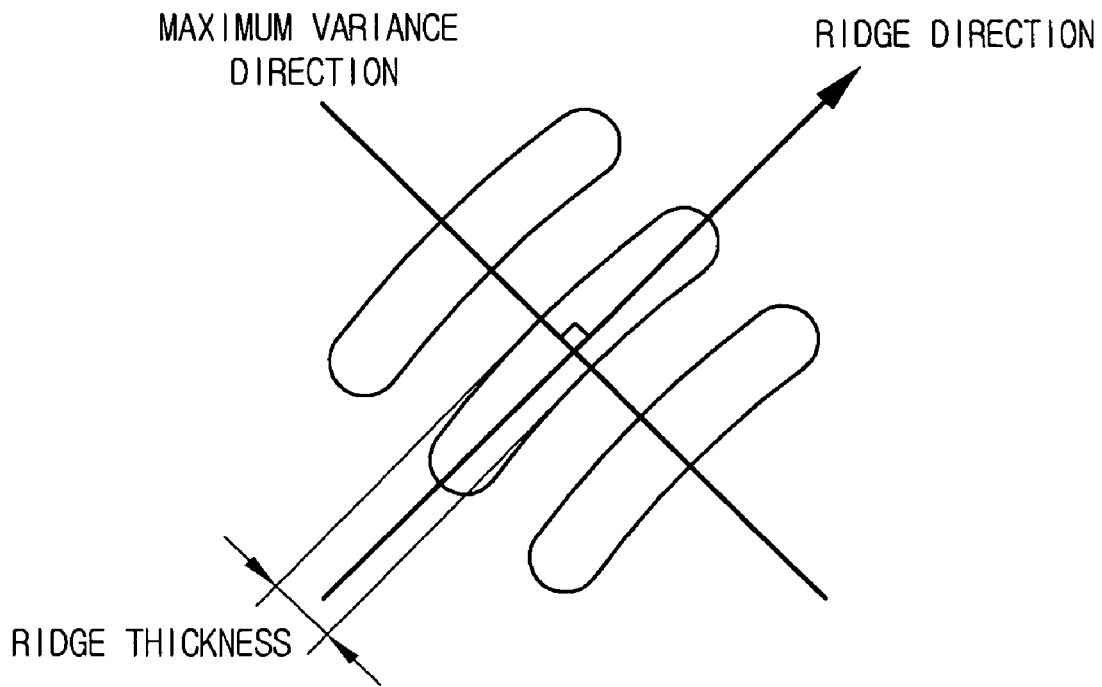
FIG. 3 is a diagram illustrating a ridge direction detection scheme for forming a sub-image during the binary coding method according to an embodiment of the present invention.

Referring to FIGS. 2 and 3, pixel values along each directional vector, with reference to a core pixel of the 16×16 pixel window sub-image, are selected. Variances for the eight directional vectors are calculated. From the eight direction vectors, a directional vector having a maximum variance is determined.

A directional vector that is normal to the maximum variance is set as the ridge range direction of the 8×8 pixel window sub-image. A thickness and resolution of the ridge is obtained using the maximum variance. For example, a first directional vector is determined to have a larger variance than that of a second directional vector when a larger number of ridges pass through the first directional vector than that of the second directional vector, whereby the ridges are disposed in parallel with each other. The second directional vector that is perpendicular to the first directional vector is in parallel with the ridge range direction. The ridge thickness is, in one example, calculated using the number of the pixels that are perpendicular to the ridge range direction.

Afterwards, the above-described process is repeated upon the core pixel being moved a specified distance and the above described binary imaging process begins. Using this binary image process, the ridge range direction, the ridge thickness and the resolution of the ridge may be detected. A ridge curvature is defined, for example, by comparing a ridge range direction of pixels in a first local portion with pixels in a second local portion that are adjacent to the first local portion.

The ridge range direction detected, by the above-described process, may be locally utilized to determine the ridge range. This detected ridge range may be different from the original ridge range as a result of image flaws and fingerprint damage. To compensate for the image flaws and fingerprint damage, a ridge having a simple range property with less curvature compared with that of an adjacent ridge is corrected in a post-processing operation. The post-processing operation references the direction of the adjacent ridge range to assist with correction.

Meanwhile, binary coding is performed on the fingerprint image using a binary coding filter that is selected in accordance with at least one of the ridge thickness and curvature. One of an orientation-specific binary coding filter or a 2-dimensional Gaussian binary coding filter may be selected as the binary coding filter.

The ridge curvature is compared with a predetermined reference value (S103). Orientation-specific binary coding is performed within an area where a ridge curvature is determined that is less than the reference value (S104). A Gaussian binary coding is performed for the area where a ridge curvature is greater than the reference value (S105). Consecutive performance of the above binary coding method may utilize each of the binary filters for converting the fingerprint image into the binary code image (S106).

An area occupied by the image, referred to as filter size, is utilized by the binary coding varies in accordance with the ridge thickness. A larger ridge thickness equates to a larger filter size. As a result, a reference range of the peripheral pixels is enlarged so that binary coding maintains accurate calculations. A smaller ridge thickness equates to a smaller filter size. As a result, a reference range of the peripheral pixels is reduced which reduces calculation time and maintains accurate performance for the binary coding.

According to another feature of the invention, a binary filter may be chosen in accordance with the ridge curvature. A relation between the ridge curvature and the binary filter will be described hereinafter in more detail.

Figure 4:
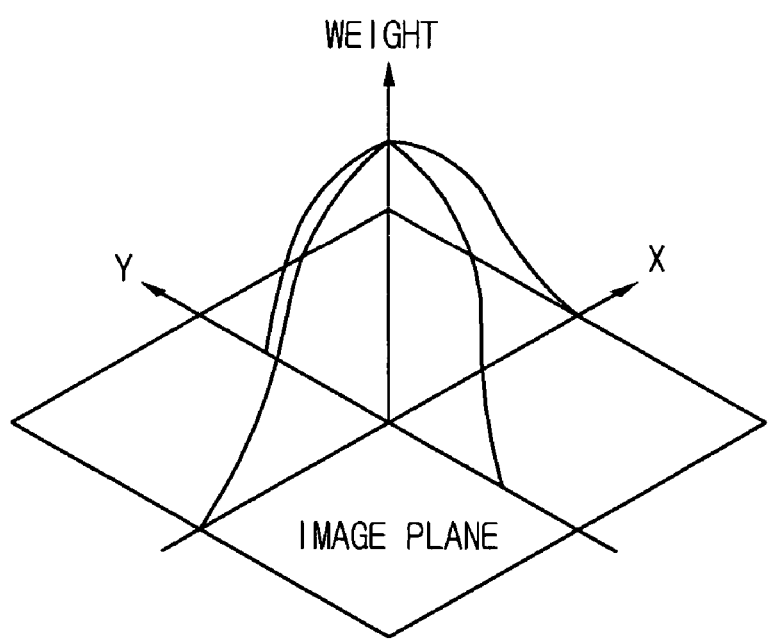
FIG. 4 is a diagram illustrating an example of an orientation-specific binary coding filter.

FIG. 4 is a diagram illustrating an example of an orientation-specific binary coding filter.

Referring to FIG. 4, a weighting distribution of the orientation-specific binary coding filter is chosen. In this example, the weighting distribution is an oval shape. A longitudinal direction of the oval shape reflects a higher value than all other directions. The weight distribution is chosen to emphasis features of the image in a specific direction. The specific direction indicates the ridge range direction of the fingerprint image.

When the orientation-specific binary coding filter is applied, the ridge curvature deviation is small. In one embodiment, an orientation-specific binary coding filter is used if the correlation of the ridge curature to the specific direction is high. More specifically, when an area that the ridge curvature is small and the ridge range extends in a pre-determined direction, the orientation-specific binary coding filter removes minor fingerprint damage, such as a ridge break or an image flaw, which are incurred when inputting the fingerprint image. This allows for recovering characteristics of a ridge having a continuous shape. Furthermore, the orientation-specific binary coding filter is designed to separate the ridges attached to each other.

By using the orientation-specific binary coding filter, more accurate fingerprint images may be obtained when performing binary fingerprint image coding.

Figure 5:
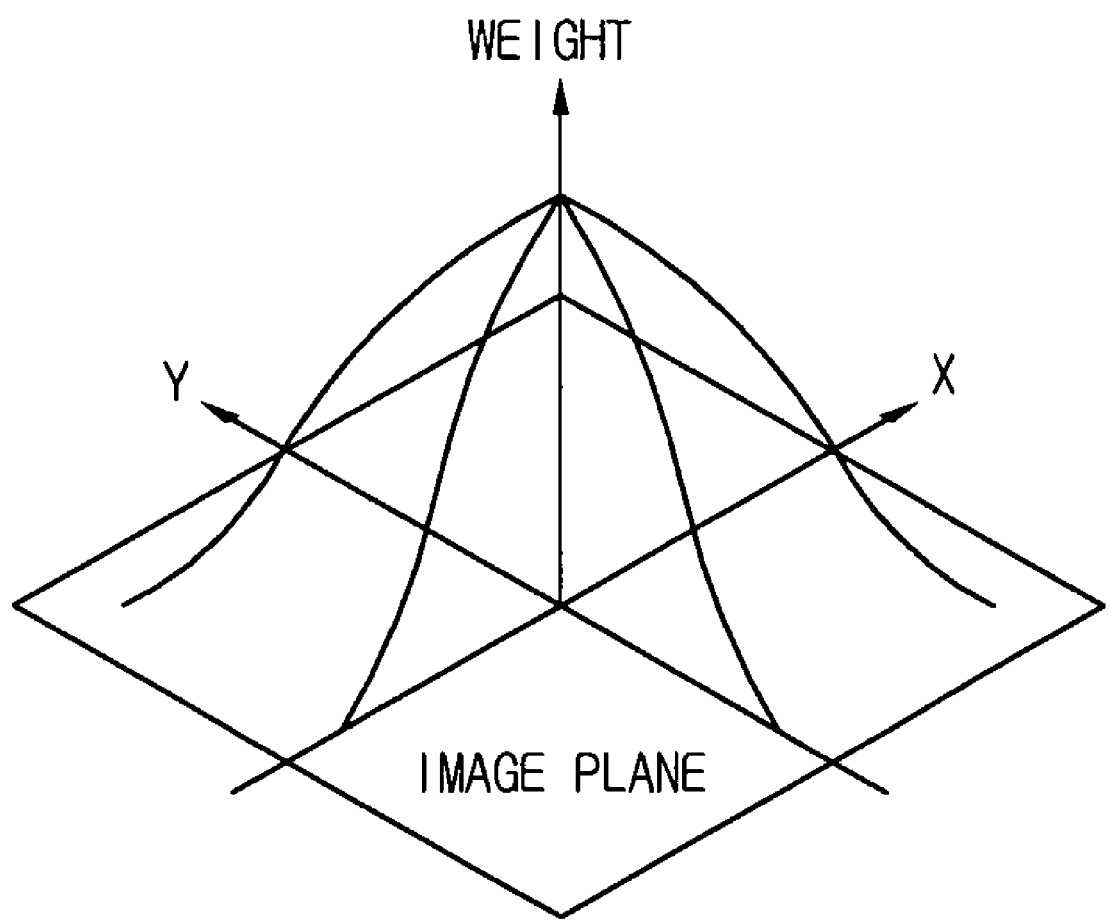
FIG. 5 is a diagram illustrating an example of a two-dimensional Gaussian binary coding filter.

FIG. 5 is a diagram illustrating an example of a two-dimensional Gaussian binary coding filter.

Referring to FIG. 5, a weighting distribution of the 2-dimensional Gaussian binary coding filter is created in a circular shape. The weighting distribution, in this exemplary filter is identical in all directions for allowing the binary coding method to capture the original image. The Gaussian filter is well-suited for situations where a weighting function in a specific direction may be difficult to apply, such as along the ridge range direction.

The two-dimensional Gaussian binary coding filter is applied to a large ridge curvature where, normally, there is great difficultly choosing a filter having characteristics along a specific direction. More specifically, a Gaussian binary coding filter is chosen in an area where a ridge range direction cannot be specified along any specific direction. In one example, the Gaussian binary coding is applied in an area where the ridge range is formed in a multi-faceted figure and the core pixel of the fingerprint would have difficultly defining the ridge range direction along a normal direction.

The present invention varies the size of the binary coding filter according to the ridge thickness; thus, this invention results in a fingerprint image that may more accurately converted a fingerprint image into a binary code image.

The present invention removes the image flaws and recovers the ridge to maintain the original fingerprint image for obtaining a more accurate fingerprint image.

The present invention provides an advantage for obtaining an accurate fingerprint image in light of variations of a user's specific properties resulting from skin tissue, temporary fingerprint damage, and image flaws formed while inputting the fingerprint. Furthermore, the inventive binary coding method can minimize the recognition error or the recognition fail of the fingerprint. The present invention accurately extracts the feature vector of the fingerprint image that is required for fingerprint recognition resulting in improved fingerprint imaging accuracy.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A binary coding method of a fingerprint image, comprising: using a system to perform the steps:
    detecting a ridge curvature of the fingerprint image; and
    performing a binary coding of the fingerprint image using one of a first binary coding filter and a second binary coding filter, the first binary coding filter emphasizing a ridge range direction of the fingerprint and the second binary coding filter increasing a reflection degree of an original fingerprint image,
    wherein the binary coding filter is used when the ridge curvature is less than a predetermined value and the second binary coding filter is used when the ridge curvature is greater than the predetermined value.

2. The binary coding method according to claim 1, wherein the ridge curvature is calculated based on the ridge range direction with respect to a sub-image of the fingerprint image.

3. The binary coding method according to claim 1, wherein the ridge curvature is calculated on the basis of the ridge range direction with respect to a first sub-image and a second sub-image, wherein the first sub-image occupies a smaller surface area than the second sub-image.

4. The binary coding method according to claim 1, wherein the ridge range direction is defined along a first direction and in response to a maximum variance direction calculated from directional vectors that are defined in accordance with a core pixel contained in a sub-image of the fingerprint image.

5. The binary coding method according to claim 4, wherein the directional vectors are defined along N directions from the core pixel.

6. The binary coding method according claim 4, wherein the directional vectors are applied with respect to a sub-image of the fingerprint image.

7. The binary coding method according to claim 4, wherein the ridge range direction is defined with respect to a sub-image of the fingerprint image.

8. The binary coding method according to claim 1, wherein the ridge curvature is calculated with reference to a ridge range direction defined with respect to a plurality of adjacent sub-images.

9. A binary coding method of a fingerprint image, comprising: using a system to perform the steps:
    detecting a ridge range direction of an original fingerprint image;
    detecting a ridge curvature using the ridge range direction; and
    performing a binary coding of the fingerprint image using one of a first binary coding filter and a second binary coding filter, the first binary coding filter emphasizing a ridge range direction of the fingerprint and the second binary coding filter increasing a reflection degree of an original fingerprint image,
    wherein the first binary coding filter is used when the ridge curvature is less than a predetermined value and the second binary coding filter is used for increasing a reflection degree of the original fingerprint image when the ridge curvature is greater than the predetermined value.

10. The binary coding method according to claim 9, wherein the first binary coding filter is an orientation-specific binary coding filter.

11. The binary coding method according to claim 9, wherein the second binary coding filter is a Gaussian binary coding filter.

12. The binary coding method according to claim 9, wherein the first binary coding filter has a weighting function of an oval-shape.

13. The binary coding method according to claim 9, wherein the first binary coding filter has a greatest weighting concentration in the ridge range direction.

14. The binary coding method according to claim 9, wherein the second binary coding filter has a weighting distribution that is formed in a circular-shape.

15. A binary coding method of a fingerprint image, comprising: using a system to perform the steps:
    detecting a ridge thickness, and a ridge curvature of the fingerprint image; and
    performing a binary coding of the fingerprint image using one of a first binary coding filter and a second binary coding filter, the first binary coding filter emphasizing a ridge range direction of the fingerprint and the second binary coding filter increasing a reflection degree of an original fingerprint image,
    wherein the first binary coding filter is used when the ridge curvature is less than a predetermined value and the second binary coding filter is used when the ridge curvature is greater than the predetermined value and the binary coding filter size varies in accordance with the ridge thickness.

16. The binary coding method according to claim 15, wherein the surface area of the binary coding filter increases as the ridge thickness is increased.

17. The binary coding method according to claim 15, wherein the first binary coding filter is an orientation-specific binary coding filter.

18. The binary coding method according to claim 15, wherein the second binary coding filter is a Gaussian binary coding filter.

* * * * *